US012284733B2

(12) United States Patent
Archer et al.

(10) Patent No.: US 12,284,733 B2
(45) Date of Patent: Apr. 22, 2025

(54) LIGHTING SYSTEM WITH A PROGRAMMABLE CORRELATED COLOR TEMPERATURE SETTING AND DIMMER LEVEL

(71) Applicant: ERP POWER, LLC, Moorpark, CA (US)

(72) Inventors: Michael Archer, Moorpark, CA (US); Steven C. Krattiger, Northridge, CA (US); Louis Chen, Simi Valley, CA (US); James H. Mohan, Valencia, CA (US); Yuko Nakazawa, Santa Cruz, CA (US)

(73) Assignee: ERP POWER, LLC, Westlake Village, CA (US)

( * ) Notice: Subject to any disclaimer, the term of this patent is extended or adjusted under 35 U.S.C. 154(b) by 454 days.

(21) Appl. No.: 17/860,940

(22) Filed: Jul. 8, 2022

(65) Prior Publication Data

US 2023/0023755 A1 Jan. 26, 2023

Related U.S. Application Data

(60) Provisional application No. 63/221,310, filed on Jul. 13, 2021.

(51) Int. Cl.
*H05B 45/20* (2020.01)

(52) U.S. Cl.
CPC .................................. *H05B 45/20* (2020.01)

(58) Field of Classification Search
CPC ................................ H05B 45/20; H05B 47/17
See application file for complete search history.

(56) References Cited

U.S. PATENT DOCUMENTS

| | | | | |
|---|---|---|---|---|
| 9,456,481 | B2 * | 9/2016 | McCune, Jr. | H05B 45/14 |
| 10,880,968 | B1 * | 12/2020 | Zhou | H05B 45/20 |
| 11,540,374 | B1 * | 12/2022 | Tan | F21V 1/143 |
| 2014/0368109 | A1 * | 12/2014 | Goscha | H01J 9/323 315/34 |
| 2017/0127485 | A1 * | 5/2017 | Hsia | H05B 45/60 |
| 2018/0317297 | A1 | 11/2018 | Qui et al. | |
| 2020/0053849 | A1 * | 2/2020 | Chowdhury | H05B 45/48 |
| 2021/0068226 | A1 * | 3/2021 | Davis | H05B 45/20 |
| 2021/0136888 | A1 * | 5/2021 | Vasquez | F21V 23/06 |
| 2023/0171858 | A1 * | 6/2023 | Han | H05B 45/48 |

* cited by examiner

*Primary Examiner* — Raymond R Chai
(74) *Attorney, Agent, or Firm* — WOMBLE BOND DICKINSON (US) LLP

(57) ABSTRACT

A programming device includes a plurality of signal lines including a first signal line and a common ground line, and a first programming circuit coupled between the first signal line and the common ground line, and including a first configurable switch configured to receive a first switch configuration, the first programming circuit being configured to receive a first power signal from the first signal line and to supply a first programming signal to the first signal line, the first programming signal having a level corresponding to the first switch configuration.

19 Claims, 9 Drawing Sheets

LIGHTING SYSTEM WITH A PROGRAMMABLE CORRELATED COLOR TEMPERATURE SETTING AND DIMMER LEVEL

CROSS-REFERENCE TO RELATED APPLICATION(S)

This application claims priority to and the benefit of U.S. Provisional Patent Application No. 63/221,310, filed in the United States Patent and Trademark Office on Jul. 13, 2021, the entire disclosure of which is incorporated by reference herein.

The present application is also related to U.S. patent application Ser. No. 17/860,904 (issued as U.S. Pat. No. 11,864,284) entitled "LIGHTING SYSTEM WITH A CLAMPED CORRELATED COLOR TEMPERATURE SETTING", filed on Jul. 8, 2022, which claims priority to and the benefit of U.S. Provisional Application No. 63/220,324, filed in the United States Patent and Trademark Office on Jul. 9, 2021, the entire disclosures of which are incorporated by reference herein.

FIELD

Aspects of the present invention are related to lighting systems.

BACKGROUND

A light emitting diode (LED) is an electronic device that converts electrical energy (commonly in the form of electrical current) into light. The light intensity of an LED is primarily based on the magnitude of the driving current. An LED light source may simulate warm colors by optically mixing light from white LEDs with other color LEDs, such as amber LEDs, and controlling their drive currents to in a manner such that the light combination changes from a white color light to a more yellowish/orangish white light.

There are applications in which many different LED fixtures are employed within a large space, and it is required to have all of the fixtures produce the same color temperature and light intensity. However, in the related art, component variances as well as temperature changes make it difficult to configure the different light fixtures in such a manner, and often the differences in light output colors are noticeable to an observer, which is undesirable.

The above information disclosed in this Background section is only for enhancement of understanding of the invention, and therefore it may contain information that does not form the prior art that is already known to a person of ordinary skill in the art.

SUMMARY

Aspects of some embodiments of the present disclosure are directed to a lighting system including a programmable light engine configured to produce light of a desired correlated color temperature (CCT) and/or dimming level based on one or more programming signals, and further including a programming device that is capable of programming the CCT level and/or the dimming level of the programmable light engine.

According to some embodiments of the present disclosure, there is provided a programming device including: a plurality of signal lines including a first signal line and a common ground line; and a first programming circuit coupled between the first signal line and the common ground line, and including a first configurable switch configured to receive a first switch configuration, the first programming circuit being configured to receive a first power signal from the first signal line and to supply a first programming signal to the first signal line, the first programming signal having a level corresponding to the first switch configuration.

In some embodiments, wherein the first power signal is a constant current signal, and the first programming signal is a voltage signal.

In some embodiments, the first power signal has a first variance, and the first programming signal has a second variance less than the first variance.

In some embodiments, the first variance is +/−10%, and the second variance is +/−0.5%.

In some embodiments, the first programming signal includes a fixed CCT signal for programming a CCT of an output light of a programmable light engine coupled to the programming device.

In some embodiments, the first programming signal includes a fixed dimmer signal for programming a dimming level of an output light of a programmable light engine coupled to the programming device.

In some embodiments, the first programming circuit includes: a voltage divider electrically coupled between the first signal line and the common ground line, and configured to generate an attenuated signal based on the first switch configuration; and a first integrated circuit coupled between the first signal line and the common ground line, and configured to generate the first programming signal based on the attenuated signal.

In some embodiments, the voltage divider includes the first configurable switch, and having a variable resistance based on the first switch configuration.

In some embodiments, the voltage divider includes: a first resistor coupled between a first node and the common ground line; and a variable resistor coupled between the first signal line and the first node, the variable resistor including the first configurable switch and having a resistance based on the first switch configuration.

In some embodiments, the variable resistor includes: a plurality of selection resistors electrically coupled in series with one another, each selection resistor of the selection resistors including: a resistor; and a switch of a plurality of switches of the first configurable switch, the switch being electrically coupled in parallel with the resistor, and configured to short across the resistor in response to being activated.

In some embodiments, the first integrated circuit includes: a shunt regulator having a reference terminal coupled to the first node, a cathode terminal coupled to the first signal line, and an anode terminal coupled to the common ground line, the shunt regulator being configured to generate the first programming signal based on the attenuated signal at the first node.

In some embodiments, the plurality of signal lines further includes a second signal line, and the programming device further includes: a second programming circuit coupled between the second signal line and the common ground line, and including a second configurable switch configured to receive a second switch configuration, the second programming circuit being configured to receive a second power signal from the second signal line and to supply a second programming signal to the second signal line, the second programming signal having a level corresponding to the second switch configuration.

In some embodiments, the first programming signal includes a fixed CCT signal for programming a CCT of an output light of a programmable light engine coupled to the programming device, and the second programming signal includes a fixed dimmer signal for programming a dimming level of the output light of the programmable light engine.

In some embodiments, the programming device further includes: a programming switch configured to selectively couple the first and second signal lines to the common ground line to signal a light engine coupled to the first and second signal lines to initiate programming mode.

According to some embodiments of the present disclosure, there is provided a lighting system including: a programming device including: a plurality of signal lines including a first signal line and a common ground line; and a first programming circuit coupled between the first signal line and the common ground line, and including a first configurable switch configured to receive a first switch configuration, the first programming circuit being configured to receive a first power signal from the first signal line and to supply a first programming signal to the first signal line, the first programming signal having a level corresponding to the first switch configuration; and a programmable light engine coupled to the plurality of signal lines and configured to supply the first power signal to the first signal line, to receive the first programming signal, and to emit light according to the first programming signal.

In some embodiments, the first programming signal includes one of a fixed CCT signal for programming a correlated color temperature (CCT) of an output light of the programmable light engine and a fixed dimmer signal for programming a dimming level of the output light of the programmable light engine.

In some embodiments, the first power signal is a constant current signal having a first variance, and the first programming signal is a voltage signal having a second variance less than the first variance, and the first variance is +1-10%, and the second variance is +/−0.5%.

In some embodiments, the programming device further includes: a programming switch configured to selectively couple the first signal line to the common ground line to signal the programmable light engine to initiate programming mode.

In some embodiments, the plurality of signal lines further includes a second signal line, and the programming device further includes: a second programming circuit coupled between the second signal line and the common ground line, and including a second configurable switch configured to receive a second switch configuration, the second programming circuit being configured to receive a second power signal from the second signal line and to supply a second programming signal to the second signal line, the second programming signal having a level corresponding to the second switch configuration.

In some embodiments, the programming device further includes: a programming switch configured to selectively couple the first and second signal lines to the common ground line to signal a light engine coupled to the first and second signal lines to initiate programming mode.

BRIEF DESCRIPTION OF THE DRAWINGS

The accompanying drawings, together with the specification, illustrate example embodiments of the present invention, and, together with the description, serve to explain the principles of the present invention.

DETAILED DESCRIPTION

The detailed description set forth below is intended as a description of example embodiments of present disclosure, provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

In some embodiments, a light engine has an input that sets the desired dim level and another that sets the correlated color temperature (CCT). This functionality allows for users to set a desired dim level while independently setting the desired CCT of the emitted light. However, not all users who purchase these light engines may choose to alter the CCT and/or the dimming level of the output light and may only desire a specific and consistent color temperature and/or dimming level among all their fixtures. In these types of situations, it is desirable to have a programming device that can precisely program the CCT level and/or dimming level. Further, accuracy and consistency among light engines is highly desired to prevent variation from fixture to fixture.

Aspects of some embodiments of the present disclosure are directed to a lighting system including a programmable light engine and a programming device, which is configured to program the light engine to produce a constant and precise CCT and/or dimming level at its light output. In some embodiments, the programming device utilizes shunt regulators, switches and other analog components to reliably and accurately provide a CCT signal and/or dimming signal that is within about 0.5% of desired output level. This allows the light engine to hold the CCT at a specific color and/or the dimming level at a level that is within 0.5% across all lights.

Figure 1:
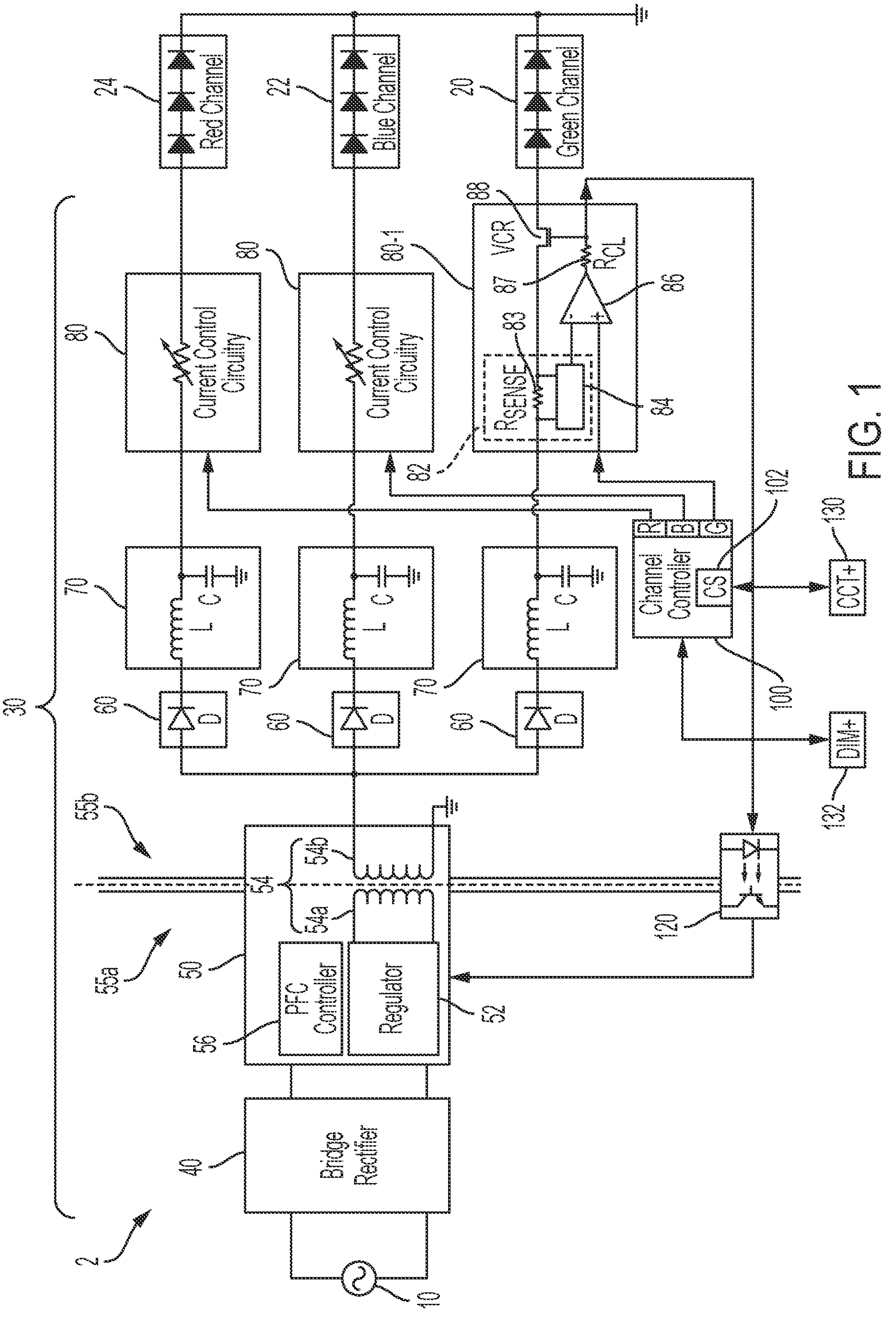
FIG. 1 illustrates a light engine including a multi-channel light driver, according to some example embodiments of the present disclosure.

FIG. 1 illustrates a light engine including a multi-channel light driver, according to some example embodiments of the present disclosure.

According to some embodiments, the light engine 2, which is powered by an input source 10, includes a plurality of color channels (e.g., a plurality of LED channels) 20, 22, and 24, and a multi-channel light driver 30 for powering and controlling the brightness/intensity of the color channels 20, 22, and 24.

The input source 10 may include an alternating current (AC) power source that may operate at a voltage of 100 Vac, a 120 Vac, a 240 Vac, or 277 Vac, for example.

In some embodiments, the plurality of color channels includes a first channel (e.g., a green channel) 20, a second channel (e.g., a blue channel) 22, and a third channel (e.g., a red channel) 24. Each channel may include one or more light-emitting-diodes (LEDs) of the corresponding colors (e.g., red, green, or blue LEDs). While in some embodiments, the first through third color channels 22-24 represent RGB colors, embodiments of the present disclosure are not limited thereto, and the plurality of channels may include any suitable number of color channels. Further, embodiments, of the present disclosure are not limited to LEDs, and in some examples, other solid-state lighting devices may be employed.

In some embodiments, the multi-channel light driver 30 includes a rectifier 40, a power supply circuit 50, a plurality of rectifiers 60, a plurality of filters 70, a plurality of current control circuits 80, and a channel controller 100.

The rectifier 40 may provide a same polarity of output for either polarity of the AC signal from the input source 10. In some examples, the rectifier 40 may be a full-wave circuit using a center-tapped transformer, a full-wave bridge circuit with four diodes, a half-wave bridge circuit, or a multi-phase rectifier.

The power supply circuit 50 converts the rectified AC signal generated by the rectifier 40 into a drive signal for powering the plurality of color channels 20, 22, and 24. In some embodiments, the power supply circuit 50 includes a voltage regulator 52 for maintaining (or attempting to maintain) a constant DC bus voltage on its output while drawing a current that is in phase with and at the same frequency as the line voltage (by virtue of the PFC circuit). A transformer 54 inside the power supply circuit 50 produces the desired output voltage from the DC bus. In some examples, the power supply circuit 50 may include a PFC circuit (or PFC controller) 56 for improving (e.g., increasing) the power factor of the load on the input source 10 and reducing the total harmonic distortions (THD) of the light driver 30. The power supply circuit 50 has a primary side 55*a* and a secondary side 55*b* that is electrically isolated from, and inductively coupled to, the primary side 55*a*. The primary and secondary sides 55*a* and 55*b* may correspond to the primary and secondary windings 54*a* and 54*b* of the transformer 54.

According to some embodiments, the multi-channel light driver 30 drives the plurality of color channels 20, 22, and 24 to produces light temperatures that follow the blackbody curve. In so doing, the multi-channel light driver 30 may perform color mixing of, for example, red, blue, and green light to achieve the desired light temperature. In some embodiments, the multi-channel light driver 30 determines the color temperature based on a dimmer setting, a time of day, or a combination thereof.

In some embodiments, the driving current of each of the plurality of color channels 20, 22, and 24 may be derived from the same secondary winding 54*b* of the transformer 54. While the plurality of color channels 20, 22, and 24 are driven by the same winding, the channel current of each color channel is independent of the other color channels. This independent control of the channel currents is enabled by utilizing a separate/different current control circuit 80 for each color channel 20/22/24.

According to some embodiments, each color channel 20/22/24 has a dedicated rectifier (e.g., diode) 60 and filter 70, which convert the AC driving signal output by the secondary winding 54*a* of the transformer 54 into a DC channel current for driving the corresponding color channel 20/22/24. The anodes of the rectifiers 60 may all be connected (e.g., directly connected) to the same output terminal of the power supply circuit 50. Having separate rectifiers 60 for each color channel allows for each channel to be driven by a different voltage. The rectifiers 60 also prevent backflow of current from one color channel 20/22/24 to another, which facilitates the accurate and individual control of channel current.

According to some embodiments, each of the plurality of current control circuits 80 is configured to adjust the channel current of the corresponding color channel 20/22/24 based on the drive signal from the power supply circuit 50 and a corresponding reference signal from the channel controller 100. The channel controller 100 is configured to generate the reference signals for the plurality of current control circuits 80 based on a desired color temperature.

In some embodiments, the current control circuit 80 is electrically coupled to the secondary side 55*b* of the power supply circuit 50 and is electrically isolated from the primary side 55*a*. The current control circuit 80 includes a current sensor 82 configured to sense a channel current ($I_{CHANNEL}$) of the corresponding color channel 20/22/24 and to generate a sense signal; an error amplifier (also referred to as a comparator) 86 configured to receive the sense signal from the current sensor 82 and the reference signal ($V_{REF}$) from the channel controller 100, and to generate the feedback signal (also referred to as an error signal/gate control signal) based on a difference between the reference signal and the sense signal; and a voltage-controlled resistor (VCR, e.g., a linear pass element) 88 that is configured to adjust the corresponding channel current by dynamically adjusting a resistance of the VCR 88 based on the feedback signal from the error amplifier 86.

In some embodiments, the current sensor 82 includes a sense resistor ($R_{SENSE}$) 83 that is coupled between the output of the power supply circuit 50 and the corresponding color channel 20/22/24 and is connected electrically in series with the corresponding color channel 20/22/24. The current sensor 82 also includes a current sense circuit 84 that is configured to sense a current of the color channel 20/22/24 by measuring the voltage drop across the sense resistor 83, and to generate the sense signal that is provided to the error amplifier 86 (e.g., to the negative input terminal of the error amplifier 86).

According to some embodiments, the VCR 88 is electrically connected in series with the sense resistor 83 and the color channel 20/22/24. In some embodiments, the VCR 88 is a field effect transistor (FET), such as a junction FET (JFET) or a metal-oxide-semiconductor FET (MOSFET) that operates in the quasi-saturation region (e.g., linear/ ohmic region) and functions as a variable resistor, whose resistance is controlled by the gate voltage.

According to some embodiments, the feedback signal from the error amplifier 86 controls the resistance of the VCR 88 to regulate the channel current to a desired value, which corresponds to the reference signal. As the current control circuits 80 dynamically adjusts the resistance of the VCR 88 in response to the instantaneous changes in the channel current, the current control circuit 80 regulates the channel current to the desired level, as determined by the corresponding reference signal.

According to some embodiments, the channel controller 100 generates a reference signal for each of the plurality of color channels 20, 22, and 24 based on the desired color intensity of the channels. For example, when the color channels include a green color channel 20, a blue color channel 22, and a red color channel 24, the channel controller may generate a first reference signal corresponding to the desired green color intensity to send to the first current control circuit 80 associated with the green color channel 20; may generate a second reference signal corresponding to the desired blue color intensity to send to the second current control circuit 80 associated with the blue color channel 22; and may generate a third reference signal corresponding to the desired red color intensity to send to the third current control circuit 80 associated with the red color channel 24. By controlling the color intensity (as measured by lumens, Lm) of each of the red, blue, and green colors output by the color channels 20, 22, and 24, the channel controller 100 may not only enable light dimming, but also adjusts the color mixing of the channels 20, 22, and 24 to replicate light temperatures (temperature in kelvins, K), which follow the black body curve.

The channel controller 100 determines the color mix (e.g., the intensity of the red, blue, and green light colors) for each color temperature based on a lookup table that provides the light intensities of the different color channels. The tabulated color mix may accurately follow the black body curve.

In some embodiments, the power supply circuit 50-1 monitors the state of the VCR 88 of the current control circuit 80-1 and adjusts its output voltage (i.e., the output voltage of the secondary winding 54*b*) to reduce or minimize the voltage drop across the VCRs 88. In some examples, current control circuit 80-1 corresponds to (e.g., is associated with) the green color channel 20.

In some examples, the feedback signal (also referred to as a correction signal) from the error amplifier 86 that controls the green color channel 20 is communicated through the primary-secondary barrier of the power supply circuit 50 via an optocoupler 120, which enables communication between the primary and secondary sides 55*a* and 55*b* while maintaining the electrical isolation between the two sides. In some embodiments, the feedback signal is provided to the PFC circuit 56, which may perform power factor correction for the power supply circuit 50.

In some embodiments, when the error amplifier 86 of the current control circuit 80-1 determines to increase the drive current of the green color channel 20 (e.g., when increasing the intensity of the green light), the corresponding feedback signal, which is transmitted to the primary side 55*a*, notifies the power supply circuit 50 to increase its output voltage to ensure sufficient drive voltage for the green color channel 20 (and hence the blue and red color channels 22 and 24). Conversely, when the error amplifier 86 of the current control circuit 80-1 determines to decrease the drive current of the green color channel 20 (e.g., when reducing the intensity of the green light), the corresponding feedback signal notifies the power supply circuit 50 to decrease its output voltage to prevent excessive power dissipation by the VCRs 88.

As such, by properly controlling the voltage headroom, the power supply circuit 50 may provide sufficient drive voltage and current to drive all of the independent color channels, while reducing or minimizing excess power dissipation by the VCRs. The multi-channel light driver 30-1 controls the headroom of all channels by using only a single feedback/control loop from one dominant color channel (e.g., the green color channel), rather than several different feedback loops. This reduces the number of optocouplers that are needed and greatly simplifies the control logic of the light driver 30-1, which translates to lower overall cost and size of the system.

According to some embodiments, the channel controller determines the correlated color temperature (CCT) of the light emitted by the color channels 20-24 via a CCT signal received through a CCT terminal (e.g., a CCT input CCT+) 130, and may determine the intensity of emitted light via a dimmer signal received through a dimmer input (e.g., a dimmer terminal DIM+) 132. In some embodiments, a current source 102 at the channel controller 100 first produces a first signal (e.g., a constant current) for transmission to the CCT clamp through the CCT terminal 130. The channel controller 100 then senses the CCT signal at the CCT terminal 130. In a similar manner, the channel controller 100 may generate a current signal (e.g., a constant current) for transmission to the DIM+ line, and may sense a dimmer signal (e.g., a constant voltage) at the dimmer input 132, and thereby determine the dimmer setting.

While FIG. 1 shows the channel controller 100 having a direct connection to the CCT and dimmer inputs 103 and 132, embodiments of the present disclosure are not limited thereto. For example, to protect the channel controller 100, the CCT and dimmer inputs 103 and 132 may be electrically isolated from the channel controller via a PWM modulator and an optocoupler, which may convey the signals at these inputs to the channel controller 100 without using a direct electrical connection.

Figure 2:
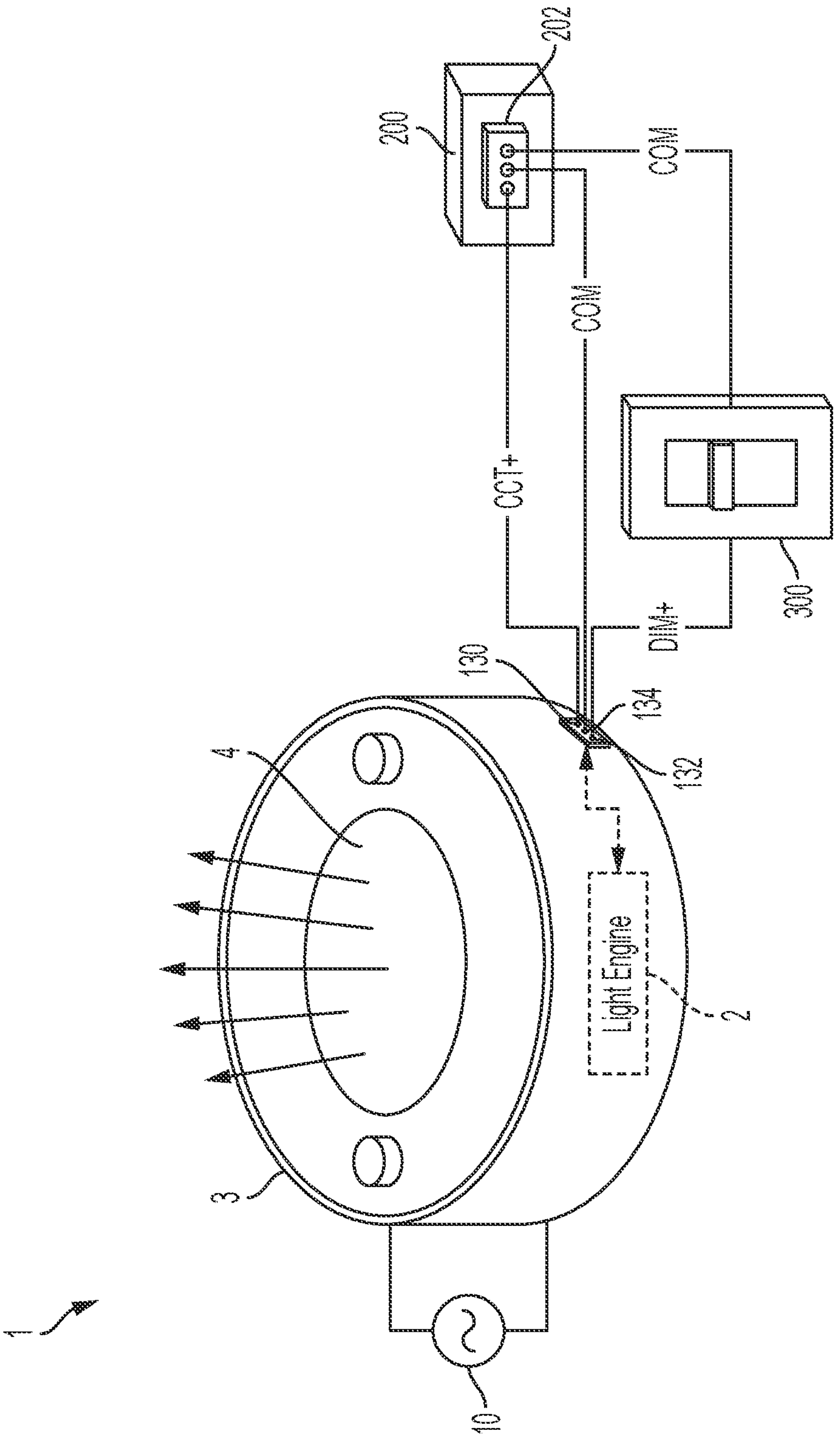
FIG. 2 illustrates a lighting system including a CCT clamp, according to some embodiments of the present disclosure.

FIG. 2 illustrates a lighting system including a CCT clamp, according to some embodiments of the present disclosure.

In some embodiments, the lighting system 1 includes the light engine 2, which is packaged within a light housing 3 having a transparent portion 4 that allows light of the color channels 20-24 to shine through to the outside environment. The lighting system 1 further includes the CCT clamp 200, which sets (e.g., fixes) the CCT of the light produced by the light engine 2. The CCT clamp 200 may be electrically coupled to the CCT terminal 130 and a common terminal (i.e., a ground reference) 134 of the light engine 2.

In some embodiments, the CCT clamp 200 is a passive device (i.e., without any independent power source) that includes only passive electronic components (such as resistor(s), diodes, etc.) and is powered by (e.g., solely powered by) the first signal output by the light engine 2 via the CCT terminal 130.

According to some embodiments, the CCT clamp 200 includes a shunt regulator that converts the first signal generated by the light engine 2, which may be variable and inaccurate, into a constant CCT signal that is accurate/precise (with very low variance). As the channel controller 100 of the light engine 2 bases the CCT of the light output on the CCT signal, the accuracy and precision of the CCT signal allows the light engine to consistently and precisely produce a desired color at its output. For example, the first signal may be a constant source current of about 500 μA, which may vary by about +/−20% (e.g., by about +/−100 μA), and the CCT signal may be a fixed/constant voltage having a variance of about 0.5% or less. Thus, the CCT clamp 200 is capable of holding the CCT terminal voltage at the desired level regardless of the variation in source current between drivers.

The lighting system 1 may also include a dimmer device 300 that can set an adjustable dimmer level by transmitting a dimmer signal to the channel controller 100 via the dimmer input 132. Here, the dimmer device 300 may be electrically coupled to the dimmer input 132 and a common terminal (i.e., ground reference) 134 of the light engine 2. The dimmer signal received by the channel controller 100 may variably reduce the electrical power delivered to the color channels 20, 22, and 24. In some examples, the dimmer may be a 0-10V dimmer. According to some examples, the dimmer interface may be a rocker interface, a tap interface, a slide interface, a rotary interface, or the like.

In some embodiments, the CCT clamp 200 includes a multi-line port 202 having a first terminal electrically coupled to the CCT terminal 130 of the light engine 2, a second terminal electrically coupled to the common terminal 134 of the light engine 2, and a third terminal that electrically couples to the ground terminal of the dimmer device 300 to the second terminal (and the common terminal 134 of the light engine 2).

Figure 3:
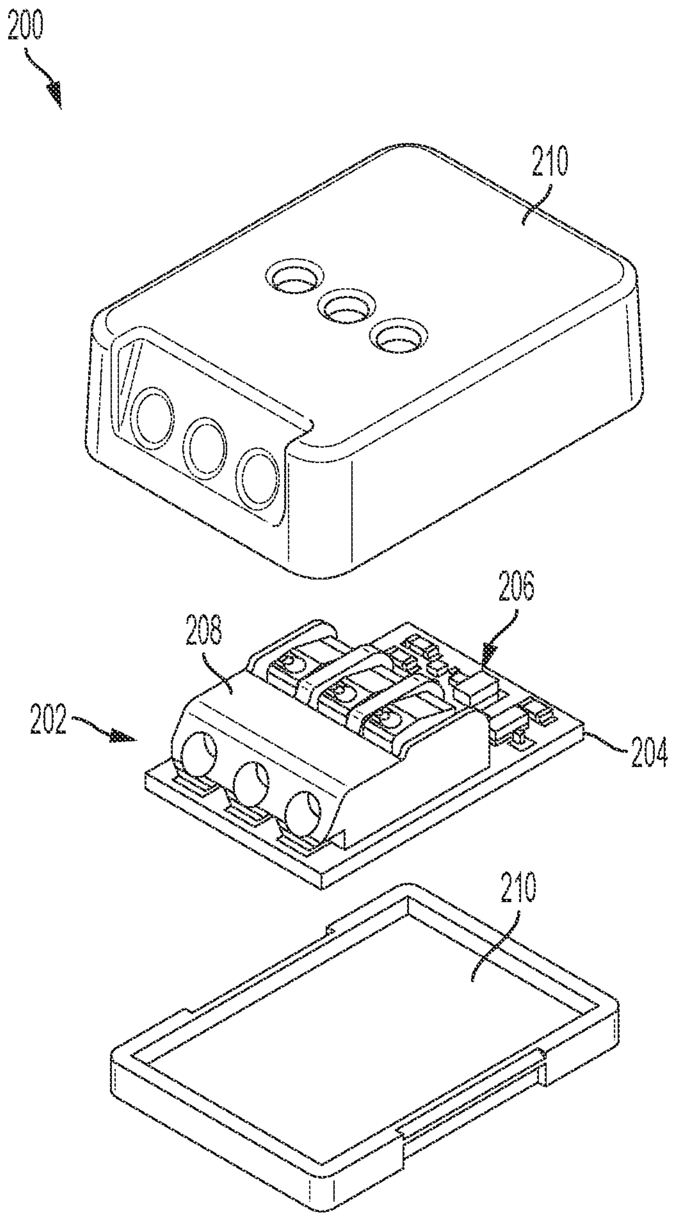
FIG. 3 illustrates the CCT clamp, according to some embodiments of the present disclosure.

FIG. 3 illustrates the CCT clamp, according to some embodiments of the present disclosure.

According to some examples, the CCT clamp may include a printed circuit board (PCB) 204 on which a regulator circuit 206 is positioned, a wire clamp 208 fixed to the PCB 204, and a housing 210 to encapsulate the PCB 204 and wire clamp 208. The wire clamp 208 has the multi-line port 202 and is configured to clamp onto the ends of three wires from the CCT terminal 130, the common terminal 134, and a ground reference of the dimmer 300, and to electrically couple the wires to the regulator circuit 206. The housing 210 may have horizontal openings corresponding to those of the multi-line port 202 at its side, and may include a number of vertical openings at its top surface, which may allow a user to engage/disengage the wires that are inserted into the wire clamp 208 through the horizontal holes.

In some embodiments, the regulator circuit 206 receives the first signal (e.g., a constant source current) from the CCT terminal 130 of the light engine 2, and produces the CCT signal (e.g., a constant voltage) at the CCT terminal 130. The CCT signal has a single and constant value. As such, depending on the desired CCT value, and hence the desired CCT signal, different configurations of the regulator circuit may be utilized.

FIGS. 4A-4D illustrate various examples of the regulator circuit of the CCT clamp, according to some embodiments of the present disclosure.

Figure 4A:
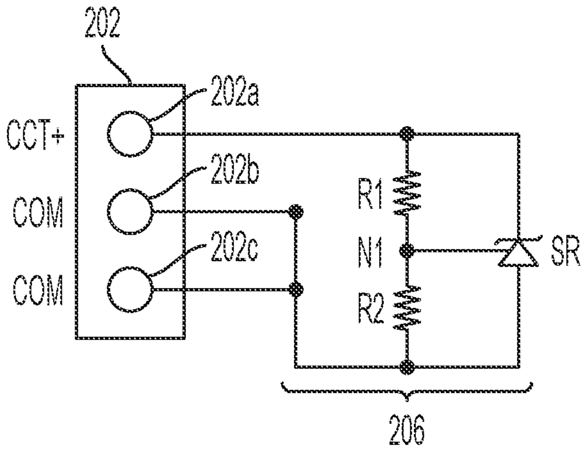
FIGS. 4A-4D illustrate various examples of the regulator circuit of the CCT clamp, according to some embodiments of the present disclosure.

Referring to FIG. 4A, the regulator circuit 206 of the CCT clamp 200 includes a voltage divider electrically coupled between the first and second terminals 202*a* and 202*b* of the multi-line port 202 and a shunt regulator SR. The voltage divider includes a first resistor R1 coupled between the first terminal 202*a* and a first node N1, and a second resistor R2 coupled between the first node N1 and the second terminal 202*b*. The reference terminal of the shunt regulator SR (through which it senses a reference/programming voltage) is coupled to the first node N1. When the constant source current (i.e., the first signal) is applied to the first terminal 202*a* through the CCT terminal 130, a voltage develops at the first node N1 that turns on the shunt regulator SR, which generates a fixed voltage (i.e., the CCT signal) at the CCT terminal 130 based on the voltage at the first node N1. This voltage is used by the channel controller 100 of the light engine 2 to determine the CCT of the output light. The shunt resistor SR may function as a configurable zener diode with a programmable output voltage (at the first terminal 202*a*) ranging from about 2.5 V to about 36 V, which is stable to 0.1% tolerance or lower across a temperature range of about −40° C. to about 125° C., and a current range of about 50 μA to about 100 mA. The output voltage of the shunt regulator SR may be determined by the reference voltage at its reference terminal (i.e., the voltage at the first node N1). The shunt regulator may include an error amplifier that compares the voltage at the reference terminal with an internal voltage (of, e.g., 2.5 V) and control the gate of one or more transistors coupled between the cathode and anode terminals of the shunt regulator SR to set the output voltage at the CCT terminal 130.

While the constant current at the first terminal 202*a* may not be very accurate and, for example, may have a variance of about 10% to about 20%, so long as the values of the first and second resistors R1 and R2 are set such that the voltage at the first node N1 is sufficient to turn on the shunt regulator SR, the voltage generated by the shunt regulator SR at the first terminal 202*a* may be very accurate, for example, to within 0.5% of the desired value of the CCT signal. This allows the light engine 2 to accurately produce a desired CCT value. This also allows light fixtures in an area that include a number of different light engines to produce light of a consistent CCT value. In some examples, the regulator circuit 206 may be utilized in applications in which a CCT signal of about 2.5 V or greater is desired. This range of voltages may correspond to CCT values of about 3000K to about 6500K. The CCT signal produced by the regulator circuit 206 may be temperature stable and have an accuracy of about 0.1% to about 0.5% within a temp range of about −40° C. to about 125° C.

Figure 4B:
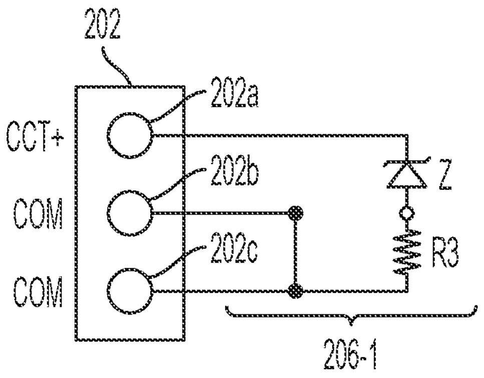

Referring to FIG. 4B, the regulator circuit 206-1 of the CCT clamp 200 includes a zener diode Z and a third resistor R3 coupled in series between the first and second terminals 202*a* and 202*b*. When the constant current (i.e., the first signal) is applied to the first terminal 202*a*, the zener diode Z may be reverse biased and generates a fixed voltage (e.g., a breakdown voltage) at the CCT terminal 130. This voltage is used by the channel controller 100 of the light engine 2 to determine the CCT of the output light. In some examples, the regulator circuit 206-1 may be utilized in applications in which a CCT signal of about 0.7 V to about 2.5 V is desired. This may correspond to CCT values of about 2000K to about 3000K.

Figure 4C:
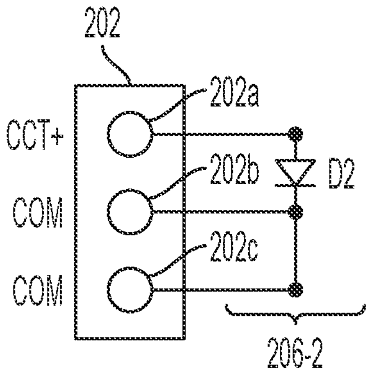

Referring to FIG. 4C, the regulator circuit 206-2 of the CCT clamp 200 includes a second diode D2 coupled between the first and second terminals 202*a* and 202*b*. When the constant current (i.e., the first signal) is applied to the first terminal 202*a*, the second diode D2 may be forward biased and generates a fixed voltage (e.g., a forward-bias voltage) at the CCT terminal 130. In some examples, the regulator circuit 206-2 may be utilized in applications in which a CCT signal of about 0.5 V to about 0.7 V is desired. This may correspond to CCT values of about 1800K to about 2000K.

Figure 4D:
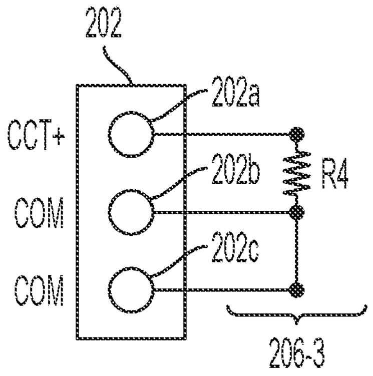

Referring to FIG. 4D, the regulator circuit 206-3 of the CCT clamp 200 includes a third resistor R3 coupled between the first and second terminals 202*a* and 202*b*. When the constant current (i.e., the first signal) is applied to the first terminal 202*a*, a fixed voltage (i.e., the CCT signal) may develop across the third resistor. In some examples, the regulator circuit 206-3 may be utilized in applications in which a CCT signal of about 0.5 V or less is desired. This may correspond to CCT values that produce warm dimming, black body dimmin, or halogen simulating dimming.

Accordingly, as described herein, the various examples of the regulator circuit do not require additional power circuitry or microprocessors to dictate the voltage output that is fed back to the light engine 2. As a result, compact CCT clamps may be constructed to clamp the CCT at any desired level by changing the analog components of the regulator circuit. Due to the precise voltage produced by the CCT clamp, fixtures in one room/area can be set to the same desired CCT by connecting to a CCT clamp that is rated/designed for the corresponding CCT level to each light driver. The CCT clamp sets/clamps CCT but allows for output dimming functionality to remain.

According to some embodiments, the lighting system includes a programmable light engine 2-1 and a programming device 300, which is configured to program the light engine to produce a constant and precise CCT and/or dimming level at its light output.

Figure 5A:
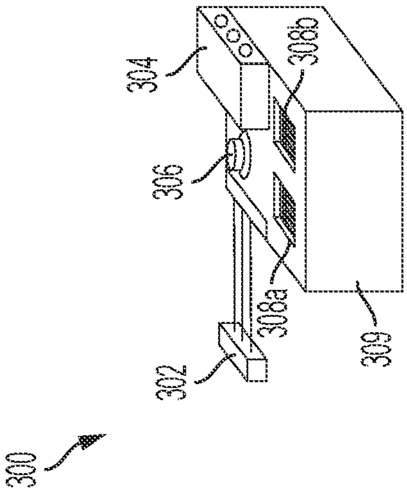
FIG. 5A illustrates a programming device of a lighting system, according to some embodiments of the present disclosure.
Figure 5B:
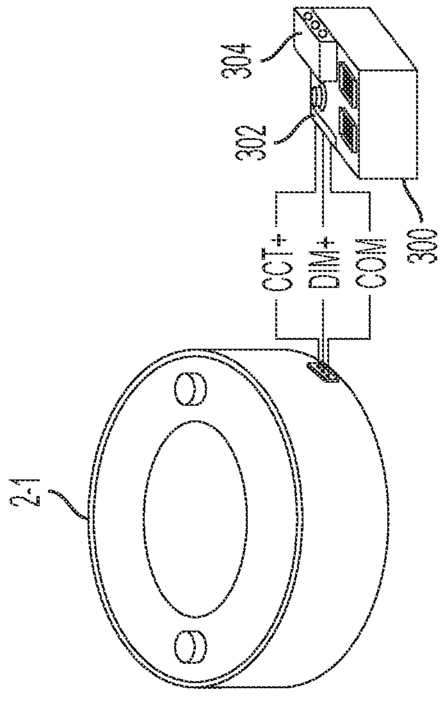
FIG. 5B illustrates a programming device coupled to the programmable light engine through lead wires, according to some embodiments of the present disclosure.
Figure 5C:
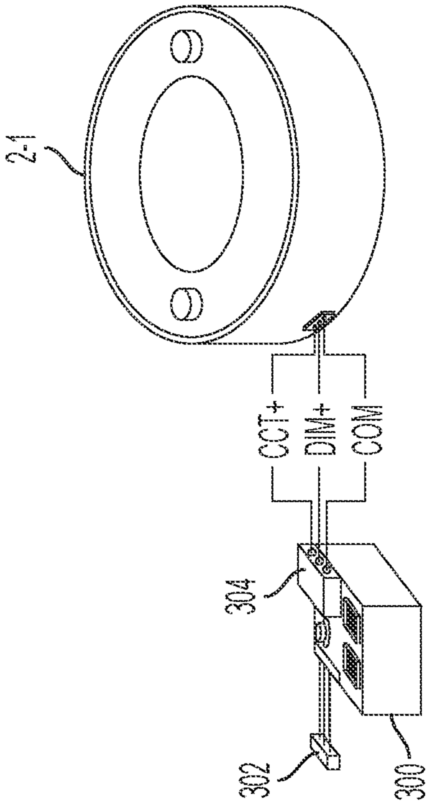
FIG. 5C illustrates a programming device coupled to the programmable light engine through block connectors, according to some embodiments of the present disclosure.

FIG. 5A illustrates a programming device 300 of a lighting system, according to some embodiments of the present disclosure. FIG. 5B illustrates a programming device 300 coupled to the programmable light engine 2-1 through lead wires, according to some embodiments of the present disclosure. FIG. 5C illustrates a programming device 300 coupled to the programmable light engine 2-1 through block connectors, according to some embodiments of the present disclosure.

In some embodiments, the programing device 300 is capable of initiating programming mode of the light engine 2-1 during which one or more of the CCT value and the dimming level of the light engine 2-1 may be programmed into the memory of the light engine 2-1. During normal operation, the light engine 2-1 relies on the programmed values to set/determine the CCT and/or dimming level of the output light. The programmable light engine 2-1 may be the same or substantially the same as the light engine described above, with the exception of having the ability to be programmed. As such, a full description of the light engine 2-1 will not be repeated here for the sake of brevity.

In some examples, the programmable device 300 may connect to and interfacing with the programmable light engine 2 via lead wires 302 or a block connector 304 (see, e.g., FIGS. % b and 5C). The existence of the lead wires 302 and the block connector 304 allows the programming device 300 to be used on a series of light engines that have connectors or pre-installed dimming and CCT wires. FIG. 5B illustrates the connection to the light engine 2-1 via the installed lead wires 302 on the programming device 300, and FIG. 5C illustrates establishing a connection by optionally feeding the light engine's dimming wires to the block connector 304 on the programming device 300.

Once connected to the programmable lighting engine 2-1, a push button 306 of the programming device 300 allows a user to initiate the programming mode of the light engine 2-1 by depressing the push button according to a particular pattern within an allotted time period.

While in programming mode, the programming device 300 offers a simplified solution for programming the light engine 2-1 via one or more configurable switches 308 (e.g., 308*a* and 308*b*). In some embodiments, the programming device 300 precisely and stably clamps the CCT and dimmer signals to the light engine 2-1 (e.g., the voltages at the CCT line (CCT+) and dimmer line (Dim+)) to desired levels that are set by the configurable switches 308*a* and 308*b*. Voltage values for the CCT and dimmer lines can be set by the end user by adjusting the configurable switch(es) 308 to program the light engine 2-1 to a corresponding setting. In doing so, the programming device 300 functionally acts as (e.g., mimics) two 0-10V dimmers that are set at a specified slider position and which drag the voltages at the CCT+ and DIM+ lines to levels corresponding to the position of the slider. When in programming mode, the light engine 2-1 utilizes the voltages on the CCT and dimmer lines to determine the CCT and dimming level settings by referencing an internal lookup table and saves the new settings for use during normal operation.

In some examples, each configurable switch 308 may be a dual in-line package (DIP) switch (e.g., one with pin jumpers, a rotary style DIP switch, a piano-style DIP or the like).

According to some embodiments, each of the CCT and dimmer lines/leads has a dedicated programming circuit (e.g., shunt regulator circuit). The programming circuit is used to provide a precise output voltage to the CCT and dimmer lines and configurable switches (e.g., dip-switches) are used to adjust the output voltage manually. Since each line has its dedicated programming circuit, the voltage signals applied to CCT and dimmer lines can be independently set.

In some embodiments, programming device 300 includes only analog devices and does not require a microprocessor to determine the clamped voltage or any power circuitry to power the programming device 300, and has a compact design that can fit into a relatively small housing 309.

Figure 6A:
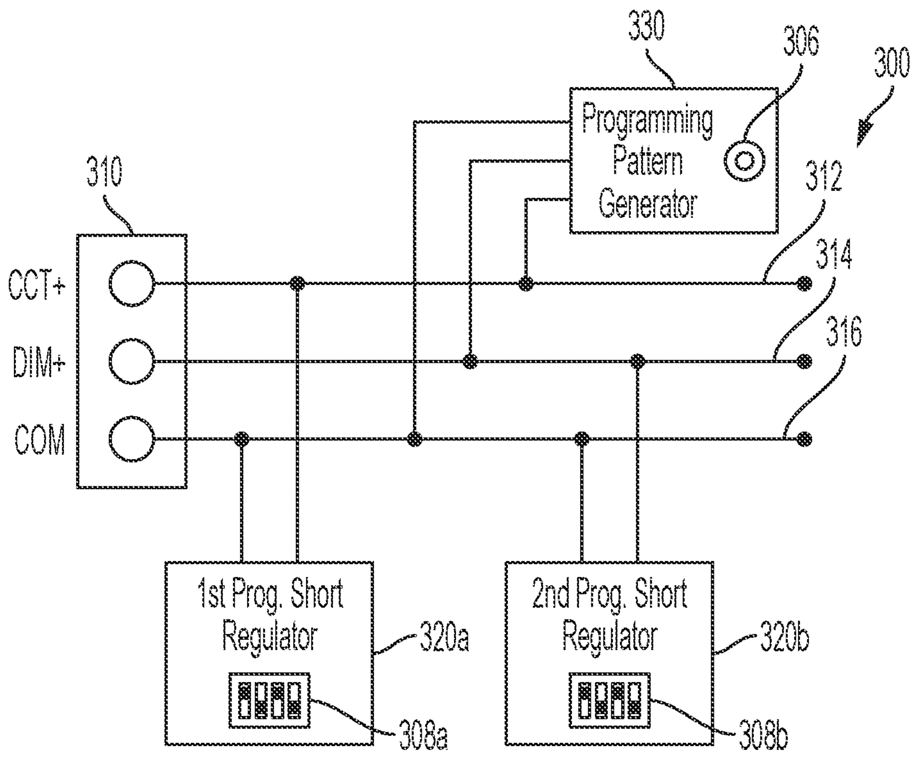
FIG. 6A illustrates a block diagram of the programming device, according to some embodiments of the present disclosure.
Figure 6B:
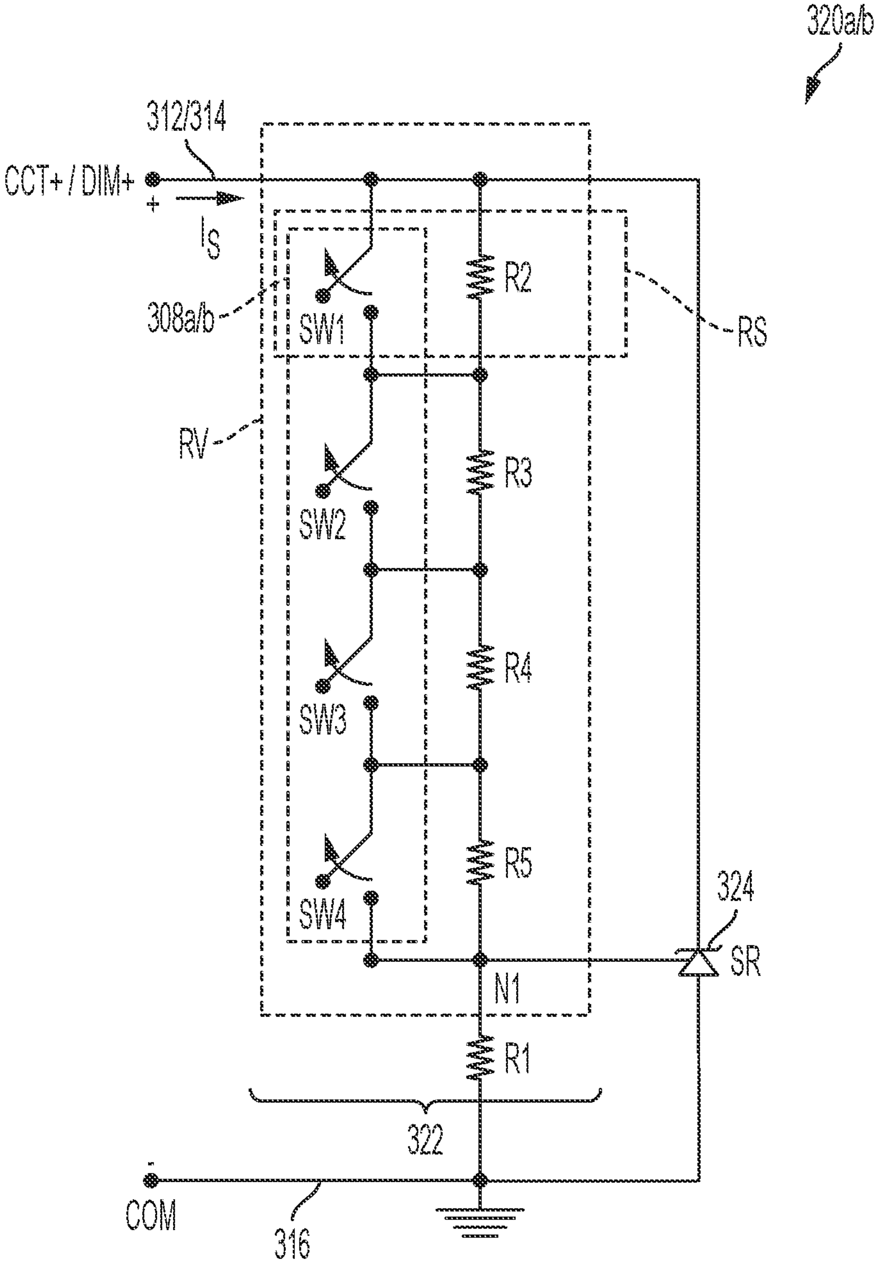
FIG. 6B illustrates a programming circuit of the programming device, according to some embodiments of the present disclosure.
Figure 6C:
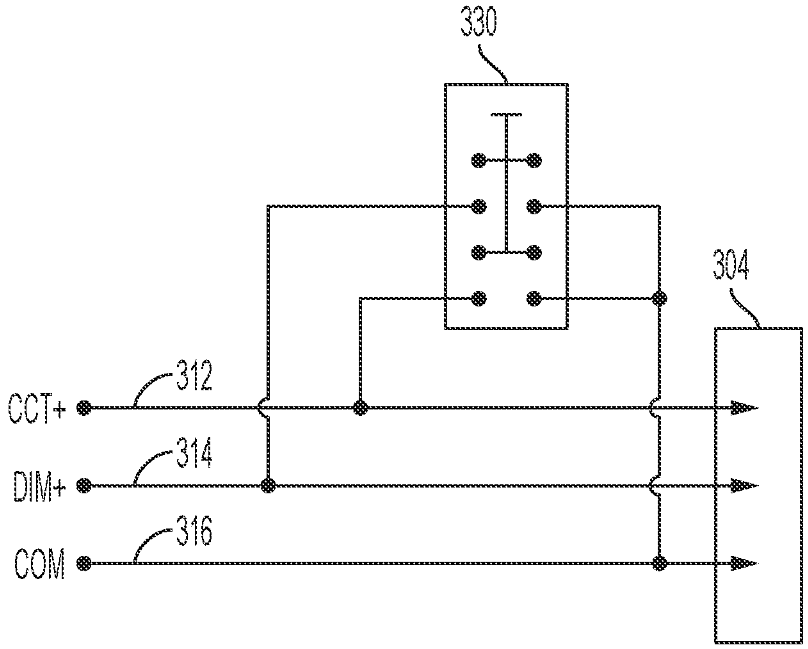
FIG. 6C illustrates a programming switch of the programming device, according to some embodiments of the present disclosure.

FIG. 6A illustrates a block diagram of the programming device 300, according to some embodiments of the present disclosure. FIG. 6B illustrates a programming circuit 320 of the programming device 300, according to some embodiments of the present disclosure. FIG. 6C illustrates a programming switch 330 of the programming device 300, according to some embodiments of the present disclosure.

Referring to FIG. 6A, in some embodiments, the programming device 300 includes a multi-line port 310 having a first terminal electrically coupled to the CCT terminal 130 of the light engine 2-1, a second terminal electrically coupled to the dimmer input 132 of the light engine 2-1, and a third terminal that electrically coupled to the common terminal 134 of the of the light engine 2-1. The programming device 300 further includes a plurality of signal lines including a first signal line 312 coupled to the first terminal, a second signal line 314 coupled to the second terminal, and a common ground line 316 coupled to the third terminal.

In some embodiments, the programming device 300 includes a first programming circuit 310*a* coupled between the first signal line 312 (e.g., the CCT line) and the common ground line 316. The first programming circuit 310*a* includes the first configurable switch (e.g., the first DIP switch) 308*a*, which is configured to receive a first switch configuration from an end user. The first programming circuit 320*a* is configured to receive electrical power, in the form of a first power signal, from the first signal line 312. The first power signal may be a constant current signal provided by the CCT terminal 132 of the light engine 2-1, and may have a first variance of about +/−10%. In response to the first power signal, the first programming circuit 310*a* supplies a first programming signal (e.g., a CCT programming signal) to the first signal line 312, which has a level corresponding to the first switch configuration. In some examples, the first programming signal may be a stable and precise regulated voltage signal, which may have a second variance of about +/−0.5%, for precisely programming a CCT of the output light of the programmable light engine 2-1.

According to some embodiments, the programming device 300 includes a second programming circuit 320*b* coupled between the second signal line 314 (e.g., the dimmer line) and the common ground line 316. The second programming circuit 320*b* includes the second configurable switch (e.g., the second DIP switch) 308*b* that is configured to receive a second switch configuration from the end user. The second programming circuit 320*b* is configured to receive electrical power, in the form of a second power signal, from the second signal line 314. The second power signal may be a constant current signal provided by the dimmer input 134 of the light engine 2-1, and may have a first variance of about +/−10%. In response to the second power signal, the second programming circuit 310*b* supplies a second programming signal (e.g., a dimmer programming signal) to the second signal line 314, which has a level corresponding to the second switch configuration. In some examples, the second programming signal may be a regulated voltage signal, which may have a second variance of about +/−0.5%, for precisely programming a dimming level of the output light of the programmable light engine 2-1.

In some embodiments, the programming device 300 further includes a programming switch (e.g., a programming pattern generator) 330 that is configured to selectively couple the first and second signal lines 312 and 314 to the common ground line 316 to signal the light engine 2-1 to initiate programming mode.

Referring to FIG. 6B, in some embodiments, each of the programming circuits 320*a* and 320*b* includes a voltage divider 322 electrically coupled between the first/second signal line 312/314 and the common ground line 316. The voltage divider 322 includes the configurable switch 308*a*/308*b* and has a variable resistance that is based on switch configuration of the configurable switch 308*a*/308*b*.

In some embodiments, the voltage divider 322 includes a first resistor R1 coupled between a first node N1 and the common ground line 316, and a variable resistor $R_v$ coupled between the first/second signal line 312/314 and the first node N1. The voltage divider 322 generates an attenuated signal at node N1 based on first/second power signal and the relative value of the first resistor R1 and the variable resistor $R_v$. The variable resistor $R_v$ includes a plurality of selection resistors $R_s$ electrically coupled in series with one another. Each selection resistor $R_s$ in turn includes a resistor (i.e., R2/3/4/5) and a switch (i.e., SW1/2/3/4) of the plurality of switches of the configurable switch 308*a*/308*b*. Each switch SW1/2/3/4 is electrically coupled in parallel with the resistor R2/3/4/5 and is configured to short across the resistor R2/3/4/5 in response to being activated (e.g., being closed). Thus, by setting the switches of the configurable switch 308*a*/308*b*, an end user can modify resistance of variable resistor $R_v$ and thus the attenuated signal generated by the voltage divider 322.

According to some embodiments, the programming circuit 320*a*/32*b* further includes a shunt regulator SR coupled between the first/second signal line 312/314 and the common ground line 316. The shunt regulator SR has a reference terminal coupled to the first node N1, a second terminal (e.g., a cathode terminal) coupled to the first/second signal line 312/314, and a third terminal (e.g., an anode terminal) coupled to the common ground line 316. The shunt regulator SR is configured to generate the first/second programming signal, which may be a precisely regulated voltage, based on the attenuated signal at the first node N1, as noted above with respect to FIG. 4A. As the attenuated signal depends on the switch configuration, by setting the switches of the configurable switch 308*a*/308*b*, an end user can set/adjust the programming signal generated by the programming circuit 320*a*/320*b*, and thus control the CCT/dimming value that the light engine 2-1 is programmed to.

Referring to FIG. 6C, the programming device 300 further includes a programming switch 330 with the aid of which the programming device 300 can compel the light engine 2-1 to enter programming mode. In this mode, the light engine observes the voltages at the first and second signal lines (i.e., the dimming CCT+ and DIM+ wires) and saves the new corresponding settings for normal operation. The programming switch (e.g., push button) 330 is configured to selectively couple the first and second signal lines 312 and 314 to the common ground line 316. The programming switch 330 allows an end user to generate a particular signal pattern (e.g., a series or pattern of electrical shorts) on the first and second signal lines 312 and 314 in a specific amount of time to compel/signal the programmable light engine 2-1 to initiate/trigger programming mode. For example, the pattern may be pressing the push button of the programming switch three times in a period of one second. The programmable light engine 2-1 is configured to monitor the CCT+ and DIM+ lines to detect this specific pattern caused by shorting the lines to ground.

While in programming mode, the light engine 2-1 references a lookup table using the voltage levels on the CCT+ and DIM+ wires to determine the CCT and dimmer level settings that are desired. In some examples, the look up table may be stored in the memory of the channel controller 100. Once the CCT and dimmer level settings corresponding to the switch configuration settings are determined, the light engine 2-1 saves the settings into memory (e.g., EEPROM) and returns to normal operation with the new permanent feature settings. Once programmed, these settings remain even through power-cycles.

In some embodiments, the lookup table maps the switch configurations of the first and second configurable switches 308*a* and 308*b* to not only CCT and dimmer level settings, but also other settings, such as bluetooth enable/disable and dim-to-off settings.

Table 1 below illustrates the mapping of the first switch configuration of the first configurable switch 308*a* to CCT of the light output of the light engine 2-1 according to some examples.

TABLE 1

| CCT Switch Configuration | | | | Description |
|---|---|---|---|---|
| 0 | 0 | 0 | 0 | Reserved |
| 0 | 0 | 0 | 1 | Reserved |
| 0 | 0 | 1 | 0 | CCT Fixed, 1800K |
| 0 | 0 | 1 | 1 | CCT Fixed, 2000K |
| 0 | 1 | 0 | 0 | CCT Fixed, 2200K |
| 0 | 1 | 0 | 1 | CCT Fixed, 2500K |
| 0 | 1 | 1 | 0 | CCT Fixed, 2700K |
| 0 | 1 | 1 | 1 | CCT Fixed, 3000K |
| 1 | 0 | 0 | 0 | CCT Fixed, 3500K |
| 1 | 0 | 0 | 1 | CCT Fixed, 4000K |
| 1 | 0 | 1 | 0 | CCT Fixed, 4500K |
| 1 | 0 | 1 | 1 | CCT Fixed, 5000K |
| 1 | 1 | 0 | 0 | CCT Fixed, 5700K |
| 1 | 1 | 0 | 1 | CCT Fixed, 6500K |
| 1 | 1 | 1 | 0 | CCT WarmDim, 2700-1800K Incandescent Profile |
| 1 | 1 | 1 | 1 | CCT WarmDim, 3050-1800K Halogen Profile |

Table 2 below illustrates the mapping of the second switch configuration of the second configurable switch 308*b* to bluetooth enable/disable, dim-to-off, and dimmer level settings of the light engine 2-1 according to some examples.

TABLE 2

| Dimmer Switch Configuration | | | | | | |
|---|---|---|---|---|---|---|
| BLE Disable | Dim To Off | Dimmer Switch | | Description | | |
| 0 | 0 | 0 | 0 | | | Full Output |
| 0 | 0 | 0 | 1 | | | 2000 lm/80% |
| 0 | 0 | 1 | 0 | | | 1500 lm/60% |
| 0 | 0 | 1 | 1 | | | 1000 lm/40% |
| 0 | 1 | 0 | 0 | | Dim-to-Off | Full Output |
| 0 | 1 | 0 | 1 | | Dim-to-Off | 2000 lm/80% |
| 0 | 1 | 1 | 0 | | Dim-to-Off | 1500 lm/60% |
| 0 | 1 | 1 | 1 | | Dim-to-Off | 1000 lm/40% |
| 1 | 0 | 0 | 0 | Bluetooth Disabled | | Full Output |
| 1 | 0 | 0 | 1 | Bluetooth Disabled | | 2000 lm/80% |
| 1 | 0 | 1 | 0 | Bluetooth Disabled | | 1500 lm/60% |
| 1 | 0 | 1 | 1 | Bluetooth Disabled | | 1000 lm/40% |
| 1 | 1 | 0 | 0 | Bluetooth Disabled | Dim-to-Off | Full Output |
| 1 | 1 | 0 | 1 | Bluetooth Disabled | Dim-to-Off | 2000 lm/80% |
| 1 | 1 | 1 | 0 | Bluetooth Disabled | Dim-to-Off | 1500 lm/60% |
| 1 | 1 | 1 | 1 | Bluetooth Disabled | Dim-to-Off | 1000 lm/40% |

As will be understood by a person of ordinary skill in the art, the number of parameters that can be programmed by the first and second programming circuits depends on the number of switches in each of the configurable switches 308*a* and 308*b* and the number of selectable levels for each programmable parameter.

Figure 7A:
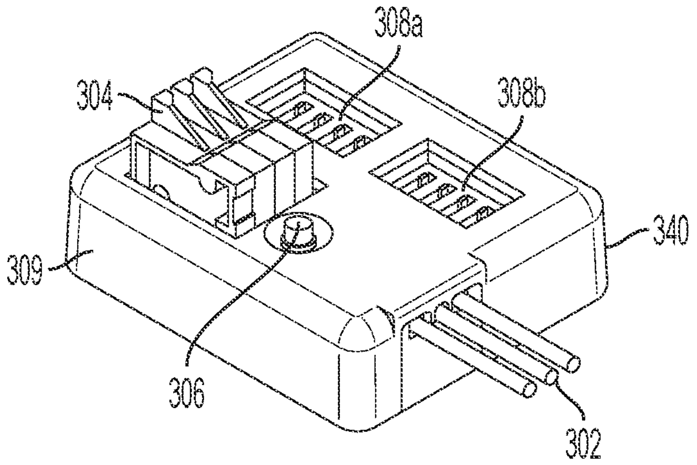
FIG. 7A-7B illustrate perspective view of the programming device, according to some embodiments of the present disclosure.
Figure 7B:
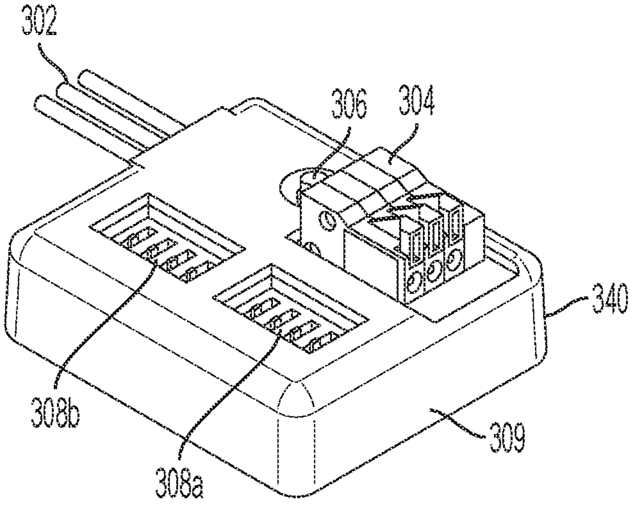

FIG. 7A-7B illustrate perspective view of the programming device 300, according to some embodiments of the present disclosure.

In some embodiments, the programming device 300 has lead wires 302 (e.g., three lead wires (CCT+, DIM+, COM)) that can be coupled to the light engine 2-1 to enable communication between the programming device 300 and the light engine 2-1. This allows light engines without preinstalled dimming leads to connect to the programming device 300. The programming device 300 also has a block connector 304 to connect to light engines with preinstalled lead wires. The components of the programming device 300 are enclosed in the housing 340, which has openings to allow a user access to the configurable switches 308*a* and 308*b* (e.g., access to the slider levers of the DIP switches). While FIGS. 7A-7B illustrate examples in which the configurable switches 308*a* and 308*b* are DIP switches that have sliding levers, embodiments of the present disclosure are not limited thereto. For example, the configurable switches 308*a* and 308*b* may be rotary style DIP switches, piano-style DIP switches, and/or the like.

It will be understood that, although the terms "first", "second", "third", etc., may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section, without departing from the spirit and scope of the inventive concept.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of", when preceding a list of elements, modify the entire list of elements and do not modify the individual elements of the list. Further, the use of "may" when describing embodiments of the inventive concept refers to "one or more embodiments of the inventive concept". Also, the term "exemplary" is intended to refer to an example or illustration.

It will be understood that when an element or layer is referred to as being "on", "connected to", "coupled to", or "adjacent" another element or layer, it can be directly on, connected to, coupled to, or adjacent the other element or layer, or one or more intervening elements or layers may be present. When an element or layer is referred to as being "directly on," "directly connected to", "directly coupled to", or "immediately adjacent" another element or layer, there are no intervening elements or layers present.

As used herein, the terms "substantially", "about", and similar terms are used as terms of approximation and not as terms of degree, and are intended to account for the inherent variations in measured or calculated values that would be recognized by those of ordinary skill in the art.

As used herein, the terms "use", "using", and "used" may be considered synonymous with the terms "utilize", "utilizing", and "utilized", respectively.

The light engine and/or any other relevant devices or components according to embodiments of the present invention described herein may be implemented by utilizing any suitable hardware, firmware (e.g., an application-specific integrated circuit), software, or a suitable combination of software, firmware, and hardware. For example, the various components of the independent multi-source display device may be formed on one integrated circuit (IC) chip or on separate IC chips. Further, the various components of the light engine may be implemented on a flexible printed circuit film, a tape carrier package (TCP), a printed circuit board (PCB), or formed on the same substrate. Further, the various components of the light engine may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer-readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

While this invention has been described in detail with particular references to illustrative embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims and equivalents thereof.

What is claimed is:

1. A programming device comprising:

a plurality of signal lines comprising a first signal line and a common ground line; and a first programming circuit coupled between the first signal line and the common ground line, and comprising a first configurable switch configured to receive a first switch configuration, the first programming circuit being configured to receive a first power signal from the first signal line and to supply a first programming signal to the first signal line, the first programming signal having a level corresponding to the first switch configuration, wherein the first programming circuit further comprising:

a voltage divider electrically coupled between the first signal line and the common ground line, and configured to generate an attenuated signal based on the first switch configuration; and a shunt regulator coupled between the first signal line and the common ground line, and configured to generate the first programming signal based on the attenuated signal.

2. The programming device of claim 1, wherein the first power signal is a constant current signal, and the first programming signal is a voltage signal.

3. The programming device of claim 1, wherein the first power signal has a first variance, and the first programming signal has a second variance less than the first variance.

4. The programming device of claim 3, wherein the first variance is +/−10%, and the second variance is +/−0.5%.

5. The programming device of claim 1, wherein the first programming signal comprises a fixed CCT signal for programming a CCT of an output light of a programmable light engine coupled to the programming device.

6. The programming device of claim 1, wherein the first programming signal comprises a fixed dimmer signal for programming a dimming level of an output light of a programmable light engine coupled to the programming device.

7. The programming device of claim 1, wherein the voltage divider comprises the first configurable switch, and having a variable resistance based on the first switch configuration.

8. The programming device of claim 1, wherein the voltage divider comprises:

a first resistor coupled between a first node and the common ground line; and a variable resistor coupled between the first signal line and the first node, the variable resistor comprising the first configurable switch and having a resistance based on the first switch configuration.

9. The programming device of claim 8, wherein the variable resistor comprises:

a plurality of selection resistors electrically coupled in series with one another, each selection resistor of the selection resistors comprising:

a resistor; and a switch of a plurality of switches of the first configurable switch, the switch being electrically coupled in parallel with the resistor, and configured to short across the resistor in response to being activated.

10. The programming device of claim 8, wherein the shunt regulator has a reference terminal coupled to the first node and configured to receive the attenuated signal, a cathode terminal coupled to the first signal line, and an anode terminal coupled to the common ground line.

11. The programming device of claim 1, wherein the plurality of signal lines further comprises a second signal line, and wherein the programming device further comprises:

a second programming circuit coupled between the second signal line and the common ground line, and comprising a second configurable switch configured to receive a second switch configuration, the second programming circuit being configured to receive a second power signal from the second signal line and to supply a second programming signal to the second signal line, the second programming signal having a level corresponding to the second switch configuration.

12. The programming device of claim 11, wherein the first programming signal comprises a fixed CCT signal for programming a CCT of an output light of a programmable light engine coupled to the programming device, and wherein the second programming signal comprises a fixed dimmer signal for programming a dimming level of the output light of the programmable light engine.

13. The programming device of claim 11, further comprising:

a programming switch configured to selectively couple the first and second signal lines to the common ground line to signal a light engine coupled to the first and second signal lines to initiate programming mode.

14. A lighting system comprising:

a programming device comprising:

a plurality of signal lines comprising a first signal line and a common ground line; and a first programming circuit coupled between the first signal line and the common ground line, and comprising a first configurable switch configured to receive a first switch configuration, the first programming circuit being configured to receive a first power signal from the first signal line and to supply a first programming signal to the first signal line, the first programming signal having a level corresponding to the first switch configuration; and a programmable light engine coupled to the plurality of signal lines and configured to supply the first power signal to the first signal line, to receive the first programming signal, and to emit light according to the first programming signal, wherein the first programming circuit further comprising:

a voltage divider electrically coupled between the first signal line and the common ground line, and configured to generate an attenuated signal based on the first switch configuration; and a shunt regulator coupled between the first signal line and the common ground line, and configured to generate the first programming signal based on the attenuated signal.

15. The lighting system of claim 14, wherein the first programming signal comprises one of a fixed CCT signal for programming a correlated color temperature (CCT) of an output light of the programmable light engine and a fixed dimmer signal for programming a dimming level of the output light of the programmable light engine.

16. The lighting system of claim 14, wherein the first power signal is a constant current signal having a first variance, and the first programming signal is a voltage signal having a second variance less than the first variance, and wherein the first variance is +/−10%, and the second variance is +/−0.5%.

17. The lighting system of claim 14, wherein the programming device further comprises:

a programming switch configured to selectively couple the first signal line to the common ground line to signal the programmable light engine to initiate programming mode.

18. The lighting system of claim 14, wherein the plurality of signal lines further comprises a second signal line, and wherein the programming device further comprises:

a second programming circuit coupled between the second signal line and the common ground line, and comprising a second configurable switch configured to receive a second switch configuration, the second programming circuit being configured to receive a second power signal from the second signal line and to supply a second programming signal to the second signal line, the second programming signal having a level corresponding to the second switch configuration.

19. The programming device of claim 18, wherein the programming device further comprises:

a programming switch configured to selectively couple the first and second signal lines to the common ground line to signal a light engine coupled to the first and second signal lines to initiate programming mode.

* * * * *